United States Patent
Kamiyama

(10) Patent No.: US 6,236,032 B1
(45) Date of Patent: May 22, 2001

(54) TRACKING PULL-IN CIRCUIT FOR REDUCING EFFECT BY A DEFECT IN A TRACKING SERVO LOOP

(75) Inventor: Hideyo Kamiyama, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/386,511

(22) Filed: Aug. 31, 1999

(30) Foreign Application Priority Data

Sep. 11, 1998 (JP) ................................................ 10-258522

(51) Int. Cl.[7] .................................................... G11B 17/22
(52) U.S. Cl. ........................... 250/201.5; 369/43; 360/69; 360/73.01
(58) Field of Search ........................... 250/201.5; 369/43, 369/44, 27, 44.32, 47, 50; 386/125; 360/69, 72.1, 73.01, 73.03, 73.09

(56) References Cited

U.S. PATENT DOCUMENTS 4,544,957 * 10/1985 Moriya et al. ........................ 386/125
4,901,299 * 2/1990 Nakatsu ................................. 369/43

* cited by examiner

Primary Examiner—Stephone B. Allen
(74) Attorney, Agent, or Firm—Sughrue, Mion, Zinn, Macpeak & Seas, PLLC

(57) ABSTRACT

The object of the present invention is to provide a tracking pull-in circuit for reducing effect by a defect and enabling securely and promptly pulling in a tracking servo loop. To achieve the above object, the following measures are taken:

In tracking pull-in operation for reducing relative moving velocity between a code read beam and a code track executed to pull the code read beam irradiated on an optical disk in a tracking servo circuit for instructing the beam to follow the code track, damping operation is forcedly inhibited in a period in which a defect is detected on the optical disk. Therefore, the wrong discrimination caused by the defect of the direction of relative movement between the code read beam and the record medium is prevented beforehand and damping operation in pulling into the tracking loop can be securely executed.

2 Claims, 5 Drawing Sheets

FIG. 5A  Stc
FIG. 5B  Sfe
FIG. 5C  Stzc
FIG. 5D  Srf
FIG. 5E  Sotr
FIG. 5F  Sdef
FIG. 5G  OUTPUT FROM OR
FIG. 5H  Slat FIG. 5J  Sbc
FIG. 5K  Sdr

TRACKING PULL-IN CIRCUIT FOR REDUCING EFFECT BY A DEFECT IN A TRACKING SERVO LOOP

BACKGROUND OF THE INVENTION

1. Field of the Invention

The present invention relates to a tracking pull-in circuit for enabling securely pulling a read beam in a tracking servo loop by inhibiting relative velocity in a direction in which the read beam crosses a code track between the read beam and a record medium in pulling in the tracking servo loop in a tracking servo circuit for instructing a code read beam to follow a code track in an information reader represented by a reproducing unit for an optical disk or an optical card and others.

2. Description of the Related Art

In the above information reader, so-called tracking servo control for instructing a code read beam to follow a code track is essential. In such tracking servo control, when a read beam is biased in a direction in which the read beam crosses a code track to follow by disturbance caused due to the eccentricity and others of an optical disk which is a record medium for example, the quantity of the bias, that is, a tracking error signal is detected and feedback control is executed so that such a tracking error signal becomes zero. That is, a tracking servo loop is configured, a read beam is controlled so that it is always on a code track and record information recorded on the code track is read.

In pulling in a tracking servo loop, damping control is executed in a direction reverse to the erroneous direction of a read beam to a code track by a tracking pull-in circuit and after relative velocity between a read beam and a record medium is sufficiently reduced, the tracking servo loop is closed.

The erroneous direction of a read beam to a code track can be acquired based upon a relationship in phase between a tracking error signal and an on-track signal showing that the read beam is in a state (in an on-track state) in which the read beam irradiates the code track.

Generally, a flaw, dust and others exist on a record medium such as an optical disk. Such flaw and dust reduce the luminous energy of the reflected light of a read beam, operate on an on-track signal and a tracking error signal respectively generated based upon such reflected light as a so-called defect and deteriorate its amplitude level.

There is a problem that when the above defect is caused during operation for pulling in a tracking servo loop, the erroneous direction of a read beam to a code track acquired based upon the above phasic relationship between a tracking error signal and an on-track signal is judged by mistake, damping is applied in a direction reverse to a direction for damping to be applied, velocity is increased by mistake and pulling in the tracking servo loop fails.

SUMMARY OF THE INVENTION

The present invention is made to solve the above problem and the object is to provide a tracking pull-in circuit for reducing effect by a defect and enabling securely and promptly pulling in a tracking servo loop.

To achieve the above object, according to a first aspect of the present invention, there is provided a tracking pull-in circuit for reducing relative velocity in the erroneous direction of a code track between a code read beam and a record medium so as to pull a code read beam irradiated on the record medium on which code tracks are formed in a tracking servo loop for instructing the code read beam to follow the code track based upon a tracking error signal, said tracking pull-in circuit comprising: tracking error signal generating means for generating a tracking error signal showing the quantity of the relative bias of a code read beam to a code track, on-track signal generating means for generating an on-track signal showing that a code read beam is on a code track, damping control signal generating means for generating a damping control signal showing either of a damping authorized state or a damping inhibited state based upon the above on-track signal, damping means for damping a code read beam in the erroneous direction of a code track according to a control signal generated based upon the above tracking error signal when the above damping control signal shows a damping authorized state and defect detecting means for detecting a defect on the record medium; wherein the damping control signal generating means forcedly changes the above damping control signal into a damping inhibited state when the above defect is detected.

According to the first aspect of the present invention, the damping control signal generating means forcedly changes a damping control signal into a damping inhibited state in case a defect is detected on a record medium.

Therefore, the wrong discrimination due to a defect of the direction of relative movement between a code read beam and a record medium is prevented beforehand and damping operation in pulling in a tracking loop can be securely executed.

According to a second aspect of the present invention, there is provided a tracking pull-in circuit as set forth in the first aspect of the invention, wherein the above damping control signal generating means is restored to a damping authorized state when the damping inhibited state of a damping control signal continues for predetermined time.

According to the second aspect of the present invention, damping control signal generating means is forcedly restored to a damping authorized state in case a damping inhibited state continues for predetermined time.

Therefore, the stored quantity of low frequency components of a tracking error signal generated when a damping inhibited state, that is, the open state of a tracking loop continues for a long time can be reduced and a damped state can be prevented from being unstable due to the above stored quantity when a damping control signal is restored into a damping authorized state.

BRIEF DESCRIPTION OF THE DRAWINGS

FIGS. 5A to 5K show the operational waveforms of a main part in the tracking pull-in circuit according to the present invention.

DETAILED DESCRIPTION OF THE PREFERRED EMBODIMENTS

Figure 1:
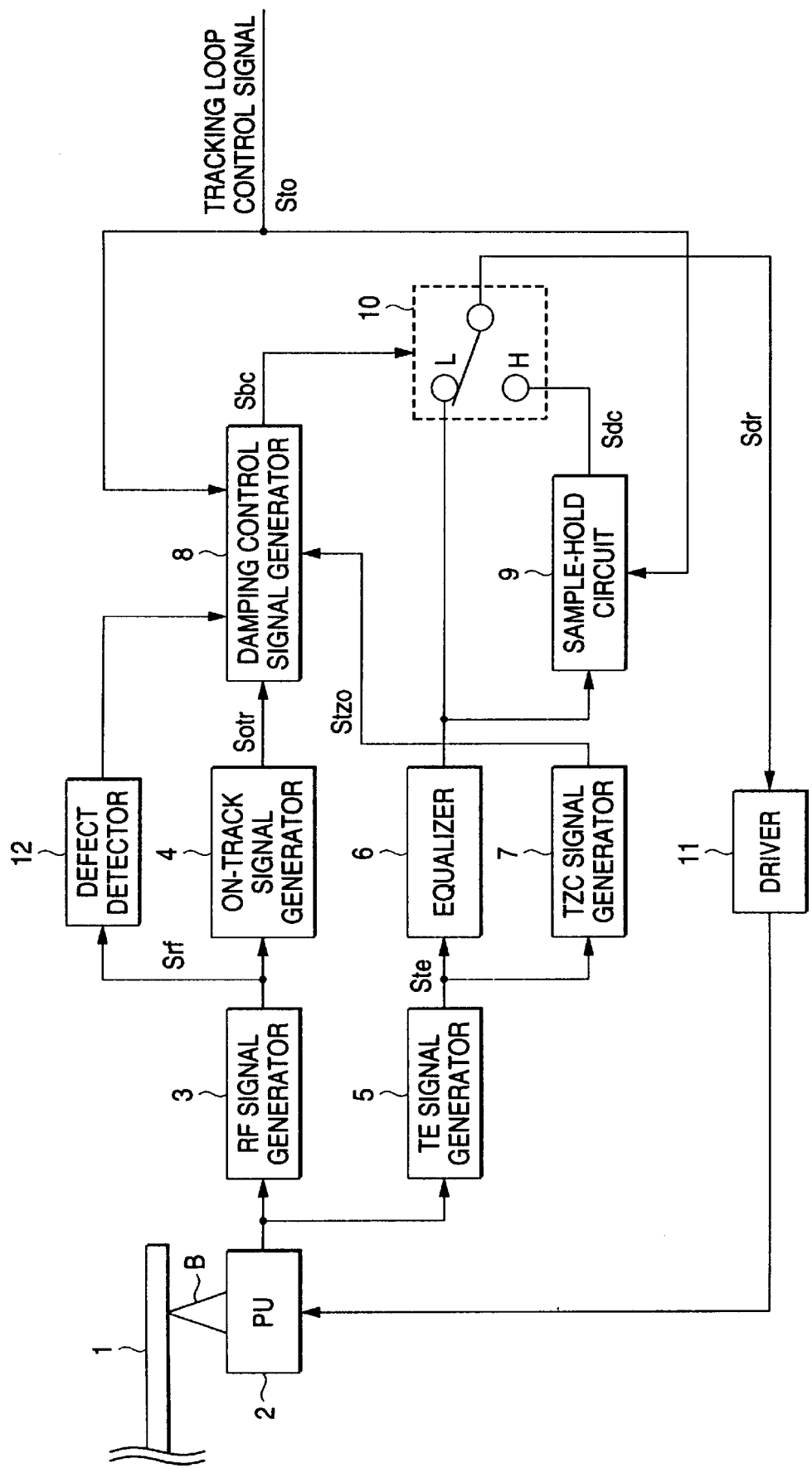
FIG. 1 is a block diagram showing the concrete configuration of a tracking pull-in circuit according to the present invention.

Now, referring to the drawings, an embodiment of the present invention will be described.

FIG. 1 is a block diagram showing a tracking pull-in circuit according to the present invention. Such a tracking pull-in circuit S is composed of a pickup 2 for irradiating a read beam B on an optical disk 1 which is a record medium rotated at predetermined rotating speed by a spindle motor not shown and detecting reflected light from the optical disk 1, a radio-frequency (RF) signal generator 3 for generating an RF signal modulated by pits forming a code track based upon the above reflected light detected by the pickup 2, an on-track signal generator 4 for extracting the envelope of the generated RF signal and generating an on-track signal Sotr showing whether a read beam is on a code track or off a code track as a binary signal by comparing the above envelope with a predetermined reference value, a tracking error signal generator 5 for generating a tracking error signal showing the quantity of bias of a read beam from a code track based upon the above reflected light according to a known tracking error generating method such as a three-beam method and a push-pull method, an equalizer 6 for extracting a predetermined band component required for tracking servo control from the tracking error signal, a tracking zero-crossing (TZC) signal generator 7 for generating a TZC signal Stzc acquired by binarizing the tracking error signal, a damping control signal generator 8 for generating a damping control signal Sbc showing the timing (that is, a damping authorized state/a damping inhibited state) of the supply of a damping signal described later to the pickup 2 based upon the TZC signal Stzc and the on-track signal Sotr when a tracking loop control signal supplied from a system controller (CPU) not shown is at a high level, that is, when a command to change the tracking loop into a closed state is received, a sample-hold circuit 9 for sampling and holding the low frequency component of the tracking error signal output from the equalizer 6 immediately before the tracking loop is changed into an open state, that is, the above tracking loop control signal is at a low level, a change-over switch 10 for selectively relaying output from the sample-hold circuit 9 and output from the equalizer based upon the above damping control signal Sbc, a driver 11 for amplifying the damping signal supplied from the change-over switch 10 to drive a tracking actuator not shown attached to the pickup 2 and a defect detector 12 for detecting the occurrence of a defect based upon the envelope of the RF signal output from the RF signal generator 3 according to a method described later.

In this embodiment, the above on-track signal Sotr which is a binary signal shows that a read beam is on a track when the signal is at a low level, that is, a read beam irradiates the code track. Therefore, a read beam is off a track when the above signal is at a high level.

Figure 2:
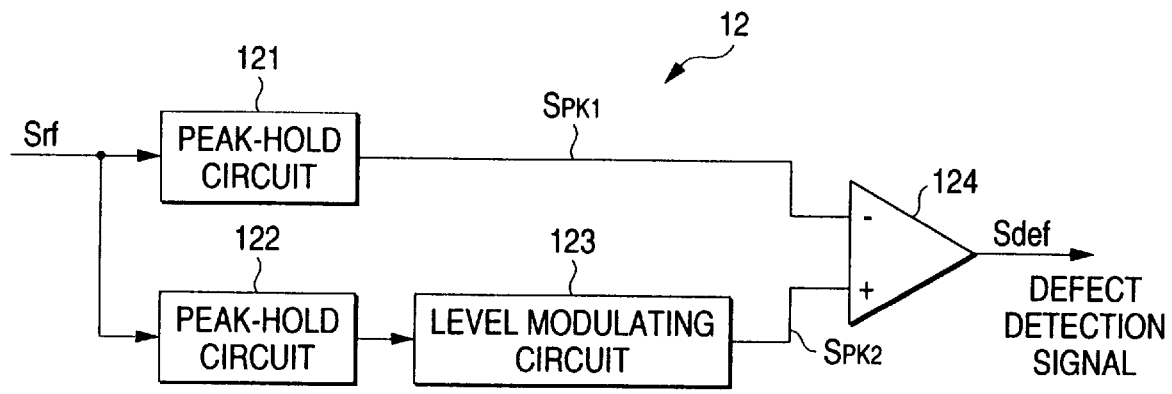
FIG. 2 shows the concrete configuration of a defect detector.

The defect detector 12 is composed of a peak-hold circuit 121, a peak hold circuit 122 having a time constant larger than the time constant of the peak-hold circuit 121, a level modulating circuit 123 for modulating the amplitude level of output from the peak-hold circuit 122 and a comparator 124 for comparing output from the peak-hold circuit 121 and output from the level modulating circuit 123 as shown in FIG. 2 for example.

The peak-hold circuit 121 holds the peak level of an RF signal output from the RF signal generator 3 for time corresponding to a set time constant. The above time constant is determined corresponding to the smallest defect of defects required to be detected according to the present invention and for example, is set to approximately a few $\mu$s. The envelope Spk1 of an RF signal the amplitude level of which lowers substantially when a defect is caused is extracted from the peak-hold circuit 121 by setting to the above time constant and is output to an inverting input terminal of the comparator 124.

In the meantime, for the peak-hold circuit 122, a time constant sufficiently larger than the time constant set for the above peak-hold circuit is set. According to the time constant, even the largest defect of defects required to be detected according to the present invention can be sufficiently detected and for example, the time constant is set to approximately a few ms. The envelope Spk2 of an RF signal the amplitude level of which lowers sufficiently later after a defect is caused is supplied from the peak-hold circuit 122 to the level modulating circuit 123 by setting to the above time constant.

The gain of the level modulating circuit 123 is modulated so that the amplitude level of the envelope Spk2 supplied from the peak-hold circuit 122 is slightly lower than the amplitude level of the envelope Spk1 output from the peak-hold circuit 121 while no defect is caused and after the level of the input envelope Spk2 is modulated based upon the modulated gain, the envelope is output to a non-inversion input terminal of the comparator 124.

Each envelope is compared by the comparator 124.

If no defect is caused in the above configuration, the peak-hold circuits 121 and 122 both continue to hold the same peak level of an RF signal, however, as the amplitude level of the envelope Spk2 output from the peak-hold circuit 122 is set so that it is slightly lower than the amplitude level of the envelope Spk1 output from the peak-hold circuit 121 by the level modulating circuit 123, a signal at a low level is output from the comparator 124.

Figure 3:
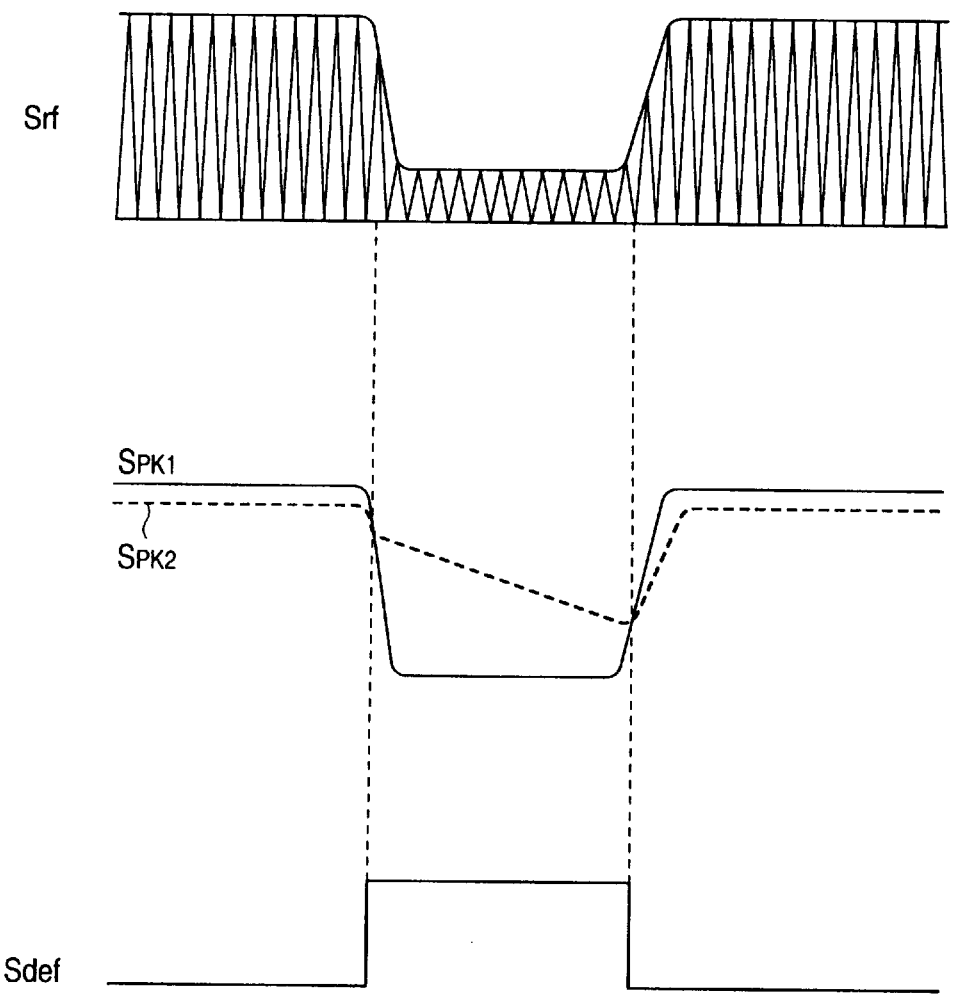
FIG. 3 shows a waveform showing the defect detecting operation of the defect detector.

In the meantime, when the envelope Spk1 from the peak-hold circuit 121 varies due to the defect so that the amplitude level of an RF signal lowers as shown in FIG. 3 if a defect is caused, the amplitude level of the envelope Spk1 lowers soon according to the above variation, however, as the envelope Spk2 from the peak-hold circuit 122 does not follow the variation soon owing to the sufficiently long time constant of the peak-hold circuit 122 even if the amplitude level of the RF signal lowers due to the defect, a defect detection signal Sdef at a high level is output from the comparator 124 later by quantity equivalent to a level modulated value by the above level modulating circuit 123 after the defect is caused. Quantity modulated by the level modulating circuit is set so that a noise component which is not a defect essentially is not detected.

Figure 4:
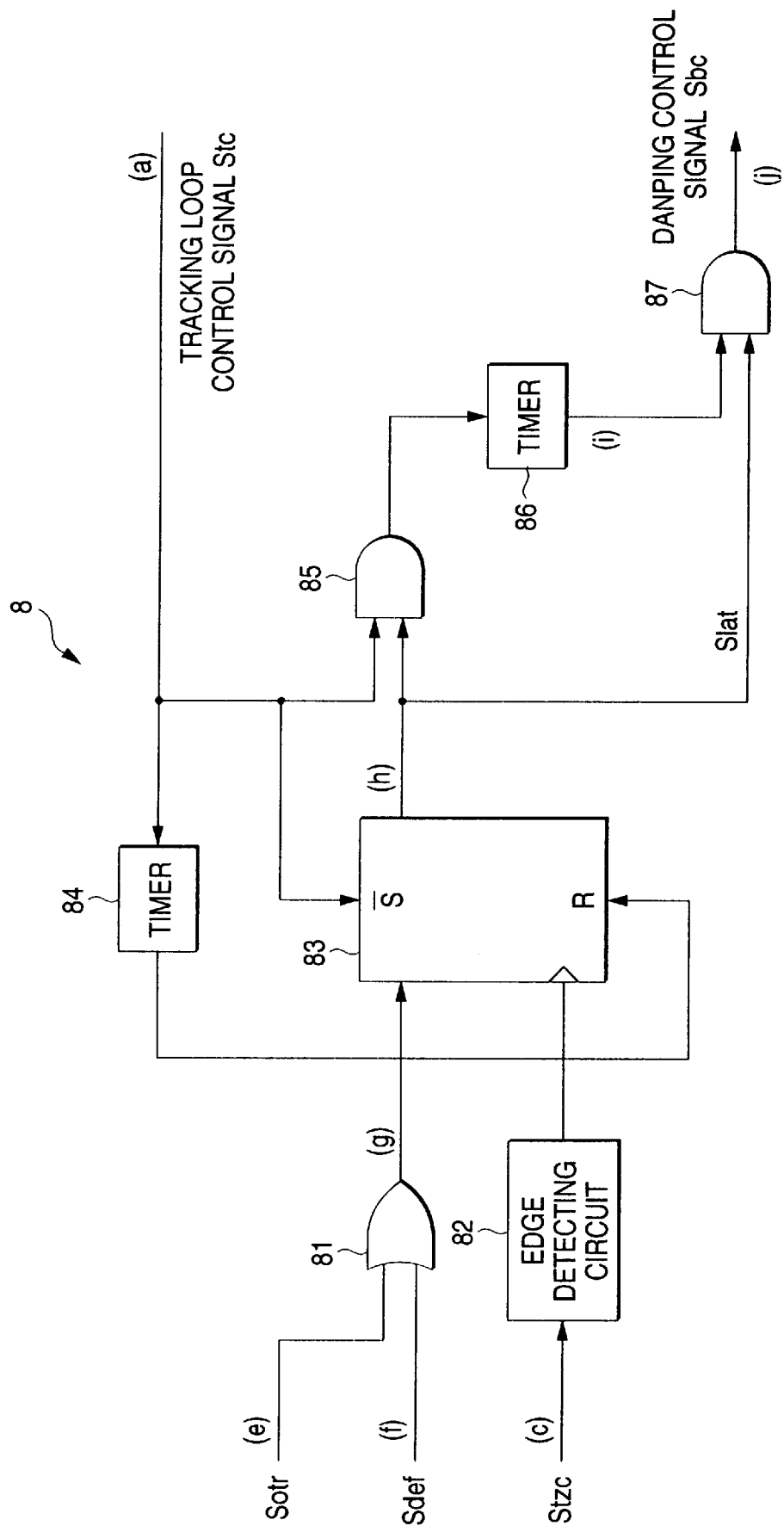
FIG. 4 shows the concrete configuration of a damping control signal generator in the tracking pull-in circuit according to the present invention.

Next, the damping control signal generator 8 is composed of an OR circuit 81 for operating OR of an on-track signal Sotr and a defect detection signal Sdef supplied from the above defect detector 12, an edge detecting circuit 82 for detecting both edges of a TZC signal Stzc, a latch 83 for latching a signal output from the OR circuit 81 at timing when the edge of a TZC signal which is the output of the edge detecting circuit 82 comes, a first timer 84 for starting timing at timing when a tracking loop control signal becomes a high level and outputting a reset pulse for resetting the latch 83 at timing when first predetermined time is timed (output from the latch 83 is at a low level), a first AND circuit 85 for operating AND of output from the latch 83 and a tracking loop control signal Stc, a second timer 86 set (which outputs a high level) while output from the first AND circuit 85 is at a low level, the timing state of which is reset at timing when output from the first AND circuit 85 becomes a high level so as to continue output at a high level, which starts timing second predetermined time and which continues output at a low level when timing the second predetermined time is finished and a second AND circuit 87 for operating AND of output from the second timer 86 and output from the latch 83 and outputting it to the changeover switch 10 as a damping control signal Sbc as shown in FIG. 4.

The latch 83 is set (outputs a high level) when a tracking loop control signal becomes a low level.

The above change-over switch 10 is switched to a terminal on the side of a low level by a damping control signal Sbc output from the second AND circuit 87, that is, a so-called tracking servo loop is formed when the change-over switch is connected so that output from the equalizer 6 is relayed and a read beam is controlled so that it always irradiates one code track.

Also, when the change-over switch 10 is connected to a terminal on the side of a high level, that is, is connected so that output from the sample-hold circuit 9 is relayed, a fixed value held by the sample-hold circuit 9 is output to the actuator not shown of the pickup 2. That is, the tracking servo loop formed by connecting to the above terminal on the side of a low level is disconnected by switching to the terminal on the side of a high level and the actuator is fixed in a position shown by the low frequency component of a tracking error signal held by the sample-hold circuit 9. The low frequency component of a tracking error signal held by the sample-hold circuit 9 is normally a direct current signal approximately at a zero level.

An RF signal output from the RF signal generator 3 is decoded by a reproducing unit not shown and a video signal and an aural signal which are record information recorded on the optical disk 1 are reproduced.

Next, referring to FIGS. 5 and 6, pull-in operation into the tracking loop in the information reader according to the present invention provided with the above configuration will be described.

FIGS. 5A to 5K show the operating waveforms of the main part of a tracking pull-in circuit according to the present invention shown in FIGS. 1 to 4 and FIG. 6 shows phasic relationship between a tracking error signal and an on-track signal in the direction of relative movement between a code read beam and a code track.

Figure 5I:
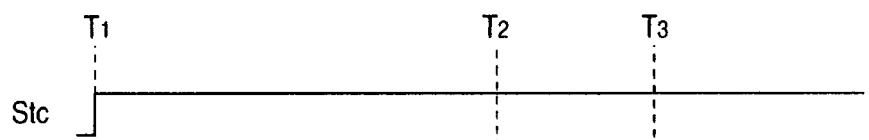
Figure 5I:
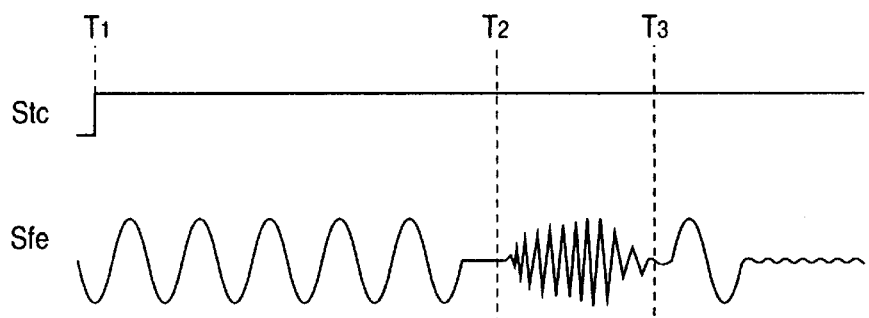
Figure 5I:
Figure 5I:
Figure 5I:
Figure 5I:
Figure 5I:
Figure 5I:
Figure 5I:
Figure 5I:
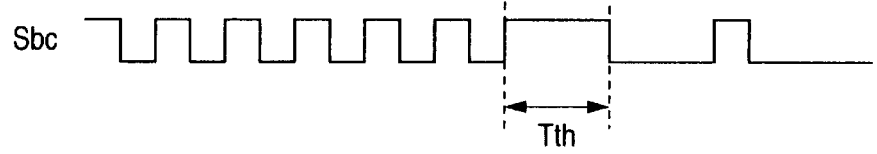
Figure 5I:

First, as shown in FIGS. 5A to 5K, when a tracking loop control signal at a high level (a closing command shown in FIG. 5A) is supplied from CPU not shown at time T1, the set state of the latch 83 is released by the damping control signal generator 8 and a signal output from the OR circuit 81 is latched at timing when the edge of a TZC signal Stzc comes as shown in FIG. 5H. An on-track signal Sotr and a defect detection signal Sdef are input to the OR circuit 81, however, if no defect is detected (a defect detection signal sdef is at a low level) (in a period other than time T2 and T3 shown in FIGS. 5A to 5K), an on-track signal Sotr is supplied to the latch 83 as it is.

Figure 6:
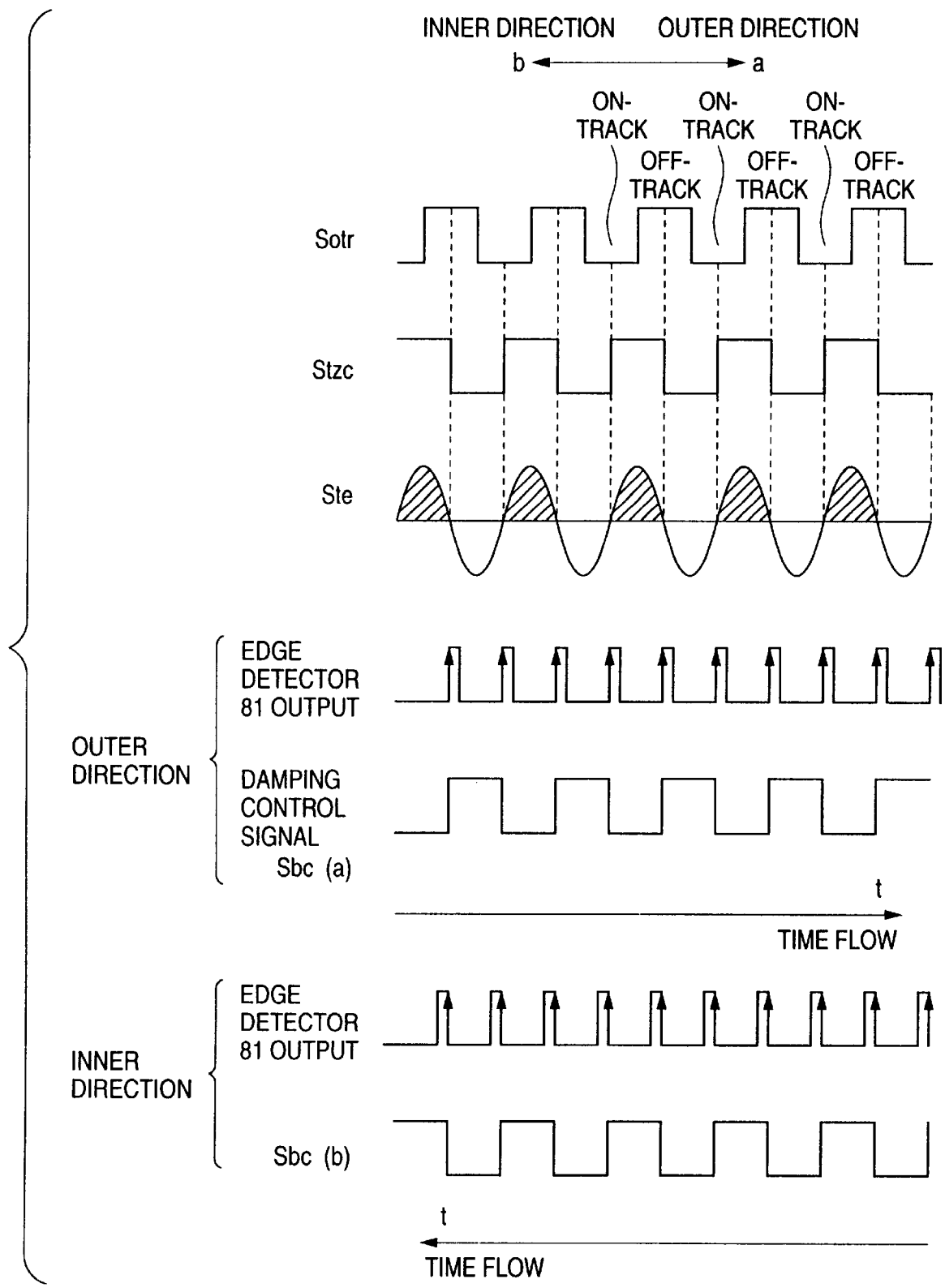
FIG. 6 shows a relationship in phase between a tracking error signal and an on-track signal in the direction of relative movement between a code read beam and a code track.

As shown in FIG. 6, the phase of a TZC signal Stzc to an on-track signal Sotr is inverted by 180° according to the erroneous direction of a read beam B to a track.

More concretely, for example, as shown in FIG. 6, as the phase of a TZC signal to an on-track signal leads by 90° in case a read beam B is moved relatively to the optical disk 1 in its outer direction (in a direction shown by a), the on-track signal Sotr becomes a low level, that is, the TZC signal Stzc when the read beam irradiates a code track changes from a low level to a high level.

In the mean time, as the phase of a TZC signal to anon-track signal lags by 90° in case a read beam B is relatively moved in the inner direction of the optical disk (in a direction shown by b), the TZC signal Stzc when the on-track signal Sotr is at a low level changes from a high level to a low level.

As described above, the phases of an on-track signal Sotr and a TZC signal Stzc change depending upon the direction of the relative movement of a read beam B to the optical disk 1. The damping control signal generator 8 outputs output from the latch 83 via the AND circuit 87 as a damping control signal Sbc utilizing the above change of the phases depending upon the direction of the relative movement to selectively supply only a tracking error signal Ste in a decelerating direction to the direction of the movement to the pickup 2.

More concretely, when a read beam is moved in the above outer direction, a binary signal shown in FIG. 6A the phase of which is inverted to a TZC signal Stzc by 180° is output from the latch 83 to the change-over switch 10 as a damping control signal Sbc to selectively extract a tracking error signal Ste for generating driving force in the inner direction (for example, a positive amplitude component (equivalent to a hatched half wave) shown in FIG. 6). The change-over switch 10 selects a tracking error signal Ste supplied via the equalizer 6 when the above damping control signal Sbc is at a low level showing a damping authorized state according to the supplied damping control signal Sbc, selects the direct current component Sdc of a tracking error signal held by the sample-hold circuit 9 when a damping control signal Sbc is at a high level showing a damping inhibited state and respectively supplies to the actuator not shown of the pickup 2 via the driver 11.

Similarly, when a read beam is moved in the inner direction, a binary signal shown in FIG. 6B in phase with a TZC signal Stzc is supplied to the change-over switch 10 as a damping control signal Sbc to selectively supply a tracking error signal Ste for generating driving force in the outer direction (for example, a half wave having a negative amplitude component shown in FIG. 6) to the actuator not shown.

As described above, the speed of the pickup 2 to the optical disk 1 is damped by selectively supplying only a tracking error signal for driving in a direction reverse to the direction of the relative movement of a read beam to the optical disk to the actuator and the above relative speed is reduced.

Therefore, if the direction of the relative movement of a read beam to the optical disk 1 is its outer direction, a binary signal Slat the phase of which leads by 90° to an on-track signal Sotr is output from the latch 83 to the first AND circuit 85 and the second AND circuit 87 as shown in FIG. 5H. As a tracking loop control signal is at a high level, the above binary signal Slat supplied to the first AND circuit 85 is supplied to the timer 86 after all. As a signal at a high level is normally output from the timer 86, a binary signal in phase with the above binary signal Slat output from the latch 83 is output from the AND circuit 87 as a damping control signal Sbc shown in FIG. 5J.

The change-over switch 10 relays a tracking error signal Ste based upon the damping control signal Sbc supplied as described above. That is, only a damping signal Sdr shown in FIG. 5K having polarity that tries to leave a read beam on a track, in other words, having polarity that decelerates the moving speed of a read beam is selectively supplied to the actuator not shown of the pickup 2 via the driver 11 and the erroneous speed of the read beam to the code track is decelerated.

A reset pulse is supplied from the timer 84 to the latch 83 when the first predetermined time elapses since a tracking loop control signal Stc at a high level is supplied. Output from the latch 83, that is, a damping control signal Sbc is forcedly changed to a low level by the above reset pulse, that is, the tracking servo loop is formed and afterward, tracking servo control by a tracking error signal Ste is executed. The above first predetermined time denotes time enough to reduce relative velocity by said damping operation in relation to pulling in the tracking loop and is normally set to approximately 5 ms.

If a command to open the tracking loop (a tracking loop control signal at a low level) is issued, the tracking loop control signal is set in the latch 83, a damping control signal Sbc at a high level is output from the latch 83 in response to the command and output from the sample-hold circuit 9 is supplied to the actuator. That is, the servo loop is opened.

Next, operation in case a defect is detected will be described.

When a defect is detected at the time T2 shown in FIGS. 5A to 5K for example on the way of tracking pull-in operation, a defect detection signal Sdef shown in FIG. 5F showing that the defect is caused is supplied to the latch 83 via the OR circuit 81 shown in FIG. 5G. In a period in which the defect is caused (a period from the time T2 to T3 shown in FIGS. 5A to 5K), a tracking error signal Ste cannot include the precise positional information of a code track and a read beam and emerges as irregular noise shown in FIG. 5B.

Therefore, output from the OR circuit 81, that is, a defect detection signal Sdef is latched by a TZC signal acquired by binarizing the tracking error signal made noise and a signal at a high level is output from the latch 83 approximately at the same time as timing when the defect detection signal Sdef comes. That is, as a signal at a high level is forcedly output from the latch 83 independent of the state of an on-track signal Sotr when a defect is detected and the signal at a high level is output to the change-over switch 10 via the second AND circuit 87 as a damping control signal Sbc, the tracking loop is opened as a result. That is, when a defect is caused, a damping authorized state which a damping control signal has shown is forcedly changed to a damping inhibited state.

Hereby, in a period in which a defect is caused, the supply of a tracking error signal Ste to the pickup 2 as a damping signal Sdr is inhibited. That is, in a period in which a defect is caused, as an acquired tracking error signal Ste does not show the precise positional information of a read beam and a code track, damping operation is inhibited, assuming that in such a period, a read beam is off a track.

Therefore, in a stable area free of a defect, tracking pull-in operation is executed, a damping signal having wrong polarity, that is, a damping signal for acceleration is never generated and damping operation accompanied by pulling in the tracking servo loop can be securely executed.

In the meantime, when a defect is detected and a signal at a high level is output from the latch 83, a signal at a high level is output from the AND circuit 85 to the timer 86. As a signal at a low level showing that the second predetermined time elapses is output from the timer 86 to the second AND circuit 87 when a period in which a defect is caused (a period from the time T2 to T3 shown in FIGS. 5A to 5K) continues for the second predetermined time Tth timed by the timer 86 or longer, a damping control signal Sbc is forcedly changed to a low level even in the period in which the defect is caused.

Hereby, time to output a held value from the sample-hold circuit 9 as a damping signal Sdr is limited and the low frequency component caused by fixing the actuator in one position for a long term by output from the sample-hold circuit 9 of a tracking error signal can be prevented from being stored in the equalizer 6. (When such a low frequency component is stored, the actuator is greatly shaken by the low frequency component when the current control is switched to control based upon output from the equalizer, it takes much time until the actuator is stabilized afterward and it is not desirable.) In the above embodiment, elapsed time since a tracking loop control signal becomes a high level is timed by the first timer 84 and when the elapsed time reaches the first predetermined time, a damping control signal Sbc is forcedly changed to a low level (for changing the servo loop to a closed state), however, if a period in which a damping control signal Sbc is at a low level continues for predetermined time even if elapsed time is within the first predetermined time, the servo loop may be also closed, assuming that relative velocity between a read beam and a code track is sufficiently reduced at this time.

If a tracking loop control signal is once changed to a low level, that is, the servo loop is forcedly opened and the tracking loop control signal is set to a high level again to control so that pull-in operation into the tracking servo loop is executed, assuming that an error occurs during the pull-in operation of a read beam in case a counter for a TZC signal Stzc is provided and the counted value of TZC signals Stzc exceeds a predetermined value within unit time during damping operation (tracking pull-in operation), more stable pull-in operation is acquired and it is desirable.

As described above, according to the tracking pull-in circuit according to the present invention, as the damping control signal generating means forcedly changes a damping control signal to a damping inhibited state in case a defect is detected on a record medium, the wrong discrimination caused by the defect of the direction of relative movement between a code read beam and the record medium is prevented beforehand, and in a first rise after the information reader provided with such a tracking pull-in circuit is powered on and in pull-in operation into the tracking loop executed after desired record information is searched, damping operation to relative velocity between a read beam and a code track can be securely executed.

What is claimed is:

1. A tracking pull-in circuit for reducing relative velocity in the erroneous direction of a code track between a code read beam and a record medium so as to pull a code read beam irradiated on the record medium on which code tracks are formed in a tracking servo loop for instructing said code read beam to follow said code track based upon a tracking error signal, comprising:

tracking error signal generating means for generating said tracking error signal showing the quantity of relative bias of said code read beam to said code track;

on-track signal generating means for generating an on-track signal showing that said code read beam is on a code track;

damping control signal generating means for generating a damping control signal showing either of a damping authorized state or a damping inhibited state based upon said on-track signal;

damping means for damping said code read beam in the erroneous direction of said code track according to a damping signal generated based upon said tracking error signal when said damping control signal shows a damping authorized state; and defect detecting means for detecting a defect on said record medium, wherein:

said damping control signal generating means forcedly changes said damping control signal into a damping inhibited state when said defect is detected.

2. A tracking pull-in circuit according to claim 1, wherein:

said damping control signal generating means restores a damping control signal to a damping authorized state when the damping inhibited state of said damping control signal continues for predetermined time.

* * * * *